US012103156B2

(12) United States Patent
Juergens et al.

(10) Patent No.: US 12,103,156 B2
(45) Date of Patent: Oct. 1, 2024

(54) ROTATING TOP GRIP

(71) Applicant: Carl Freudenberg KG, Weinheim (DE)

(72) Inventors: Ralf Juergens, Laudenbach (DE); Felix Fallenstein, Speyer (DE); Nikolai Sand, Speyer (DE); Maik Bieganski, Weinheim (DE)

(73) Assignee: CARL FREUDENBERG KG, Weinheim (DE)

( * ) Notice: Subject to any disclaimer, the term of this patent is extended or adjusted under 35 U.S.C. 154(b) by 14 days.

(21) Appl. No.: 18/307,819

(22) Filed: Apr. 27, 2023

(65) Prior Publication Data

US 2023/0347496 A1 Nov. 2, 2023

(30) Foreign Application Priority Data

Apr. 28, 2022 (DE) .................... 10 2022 110 399.4

(51) Int. Cl.
*B25G 1/10* (2006.01)
*A47L 13/254* (2006.01)
*A47L 13/42* (2006.01)

(52) U.S. Cl.
CPC ............ *B25G 1/102* (2013.01); *A47L 13/254* (2013.01); *A47L 13/42* (2013.01)

(58) Field of Classification Search
CPC ....... B25G 1/102; B25G 1/046; A47L 13/254; A47L 13/257; A47L 13/42; A47L 13/022
See application file for complete search history.

(56) References Cited

U.S. PATENT DOCUMENTS

| | | | | | |
|---|---|---|---|---|---|
| 1,609,414 | A * | 12/1926 | Lenny | B25G 3/00 15/143.1 | |
| 2,182,007 | A * | 12/1939 | Tegarty | E05B 1/0007 156/303.1 | |
| 3,699,613 | A * | 10/1972 | Skinner | E05B 1/0007 16/441 | |
| 5,927,058 | A * | 7/1999 | Hsu | A01D 7/10 56/400.17 | |
| 6,421,881 | B1 * | 7/2002 | Shovlin | F16H 59/02 74/553 | |
| 6,434,793 | B1 * | 8/2002 | Ensson | B25G 1/102 16/436 | |

(Continued)

FOREIGN PATENT DOCUMENTS

| | | | | |
|---|---|---|---|---|
| DE | 3004315 A1 * | 8/1981 | | |
| DE | 10335279 B3 * | 1/2005 | | A47L 13/42 |

(Continued)

*Primary Examiner* — Chuck Y Mah
(74) *Attorney, Agent, or Firm* — LEYDIG, VOIT & MAYER, LTD.

(57) ABSTRACT

A handle for a cleaning device, including a knob which is rotatably arranged at one end of the handle, wherein the knob includes a first knob element and a second knob element. The first knob element is connected to the second knob element, and the second knob element has a recess in which the handle is rotatably arranged. The first knob element is equipped with a latch, by which the first knob element is rotatably locked to the handle. The second knob element has a locking element, and the locking element locks the latch of the first knob element relative to the handle when the first knob element and the second knob element are connected to one another.

14 Claims, 3 Drawing Sheets

(56) References Cited

U.S. PATENT DOCUMENTS

| | | | | |
|---|---|---|---|---|
| 8,171,600 | B2 * | 5/2012 | Draper | A45C 13/262 16/113.1 |
| 9,878,436 | B1 * | 1/2018 | Castro | B25G 1/04 |
| 2009/0094791 | A1 * | 4/2009 | Blom | B25G 3/18 16/427 |
| 2011/0247157 | A1 * | 10/2011 | Caillou | B25G 1/102 15/147.1 |
| 2015/0239486 | A1 * | 8/2015 | Bertani | B25G 1/046 74/557 |
| 2017/0014986 | A1 * | 1/2017 | Chou | A01B 1/16 |
| 2019/0001480 | A1 * | 1/2019 | Harrington | B05B 12/002 |
| 2022/0134533 | A1 * | 5/2022 | Zorzo | A47L 13/42 15/144.1 |

FOREIGN PATENT DOCUMENTS

| | | | | |
|---|---|---|---|---|
| DE | 102007040514 | A1 | 3/2009 | |
| EP | 3278641 | A1 * | 2/2018 | A01B 1/02 |

* cited by examiner

ROTATING TOP GRIP

This application claims benefit to German Patent Application No. DE 10 2022 110 399.4, filed on Apr. 28, 2022, which is hereby incorporated by reference herein.

FIELD

The invention relates to a handle for a cleaning device, at one end of which a knob is rotatably arranged.

BACKGROUND

DE 10 2007 040 514 A1 discloses a handle for a cleaning device in which a knob is rotatably arranged at one end of the handle. Such a rotatably mounted knob enables the entire handle to be guided in an ergonomic way, and the hand movements while working with the cleaning device can be made easier.

The rotatably mounted knob is spherically shaped and is gripped by one hand of the user during the cleaning work. In such an embodiment, the knob has no edges whatsoever and rests comfortably in the hand of the user. The rotatable mounting of the knob makes it possible for the user both to grip the knob and to execute the typical wiping movement in the form of a horizontal eight with the handle of the cleaning device, without a relative movement and thus undesired friction taking place between the knob and the user's hand. In addition, the rotary movement of the upper wrist is reduced, allowing fatigue-free use of the handle. These ergonomic design features are advantageous particularly in the professional cleaning industry with long usage times of the cleaning device.

In this case, the knob can be fitted onto the handle of the cleaning device in a simple and inexpensive way, although it is disadvantageous here that the knob is not attached to the handle in a captive manner and could become detached during use of the cleaning device. Alternatively, the knob could also be secured on the handle in a captive manner, for example via a snap connection. However, captive connections between the knob and the handle are often complex and difficult to release subsequently, with the result that the knob can only be removed from the handle with considerable effort, e.g. for repair purposes or for fully sorted disposal.

SUMMARY

In an embodiment, the present disclosure provides a handle for a cleaning device, comprising a knob which is rotatably arranged at one end of the handle, wherein the knob includes a first knob element and a second knob element. The first knob element is connected to the second knob element, and the second knob element has a recess in which the handle is rotatably arranged. The first knob element is equipped with a latch, by which the first knob element is rotatably locked to the handle. The second knob element has a locking element, and the locking element locks the latch of the first knob element relative to the handle when the first knob element and the second knob element are connected to one another.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
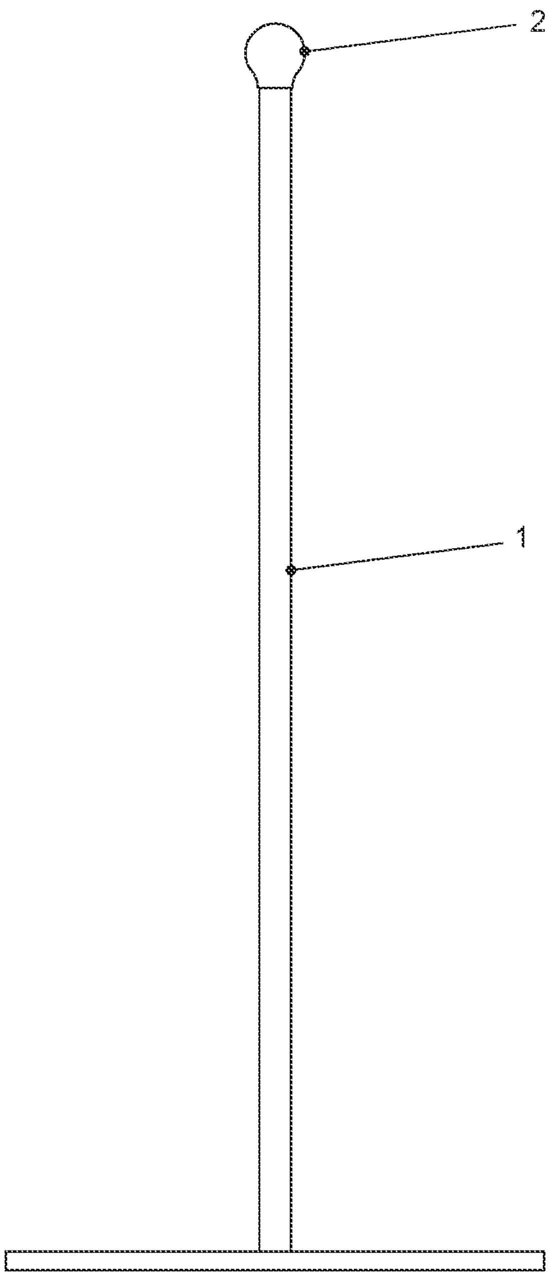
FIG. 1 illustrates a cleaning device with a handle with a rotatable knob.

In an embodiment, the present invention provides a handle for a cleaning device which is simple to produce.

The handle according to an embodiment of the invention for a cleaning device comprises a knob which is rotatably arranged at one end of the handle, wherein the knob comprises a first knob element and a second knob element, wherein the first knob element is connected to the second knob element, wherein the second knob element has a recess in which the handle is rotatably arranged, wherein the first knob element is equipped with latching means, by means of which the first knob element is rotatably locked to the handle, wherein the second knob element has a locking element, wherein the locking element locks the latching means of the first knob element relative to the handle when the first knob element and the second knob element are connected to one another.

In this case, the knob is rotatably arranged at the end of the handle remote from the cleaning device, thus allowing particularly ergonomic cleaning work, in particular an ergonomic cleaning movement in which the cleaning device is guided over the floor to be cleaned in the form of a horizontal eight. The first knob element is positively connected to the handle by the latching means of the first knob element. By virtue of the fact that the locking element of the second knob element locks the latching means, the knob is secured on the handle in an axially fixed and captive manner. Unintentional release of the knob from the handle, due, for example, to unfavourable introduction of force by the user or an impact effect when the handle falls over, can thus be prevented. Particularly for cleaning or repair purposes, the knob can be released from the handle by moving the locking element of the second knob element away from the latching means of the first knob element. In particular, it is possible in this case to change the knob without tools, for example in order to adapt the knob size to the user.

The first knob element and the second knob element can be positively connected to one another, wherein the positive connection between the first knob element and the second knob element is a snap closure. The positive connection between the first and the second knob element prevents an axial and radial relative movement between the knob elements.

The first and the second knob element are preferably designed externally as hollow hemispheres, with the result that the knob formed from the two assembled knob elements assumes a spherical shape. However, other geometric shapes, for example oval or cylindrical configurations, are also conceivable. By means of selective shaping, ergonomic enclosure of the knob by the hand of the user can be achieved, thus enabling the handle and hence the entire cleaning device to be well guided. Furthermore, flattened regions can be provided on the outside of the knob, wherein the flattened regions can also be concavely shaped. The flattened regions can serve as a support surface for individual fingers, thereby making it possible to achieve improved force introduction and ergonomics, for example. For applications in which the cleaning device is leant against a wall, the flattened regions allow an increased contact area between the wall and the knob, as compared with the spherical shape. This makes it more difficult for the cleaning device to roll off and/or slide off the wall.

In a further embodiment, the knob preferably has a spherical shape which is flattened on the side facing away from the cleaning device, thereby also making it possible for the user to guide the upper region of the handle by placing the palm of the hand thereon. This enables force to be introduced onto the flattened spherical shape and into the handle in an ergonomically particularly favourable manner. This is advantageous particularly when stubborn dirt needs to be removed by introducing increased force.

The first and the second knob element are preferably made of plastic. This makes it possible to design a knob with a low mass and, at the same time, high strength. Furthermore, the first and the second knob element can be completely or partially coated with a jacket, which is preferably formed from a rubber-elastic material. It is thereby possible not only to further enhance the ergonomics but also to damp the impact on the ground if the handle falls over. In addition, an increased coefficient of friction of the rubber-elastic material can make it more difficult for a handle which is leaning against the wall to roll off and/or slide off. In particular, it is conceivable to produce the knob by means of a two-component injection moulding method.

In the region of the circumferential edge, the first knob element can have a groove on the inside, into which a projection latches, which is formed in the region of the circumferential edge of the second knob element. This enables the knob elements to be joined without tools, thereby allowing rapid production and short set-up times. Furthermore, no adhesives whatsoever are necessary for connection and, as a result, repeated release of the connection is conceivable. Moreover, the materials required for production are reduced and fully sorted separation is made possible.

A circumferential depression can be introduced into the handle, wherein the depression receives the latching means of the first knob element. The depression is preferably designed as a circumferential groove. By virtue of the fact that the depression is introduced over the entire circumference, the first knob element can be rotated freely around the handle. The end of the handle is preferably formed with an undercut as a mushroom head.

The latching means can be designed as spring tongues. In this case, the spring tongues are preferably designed to be elastic, resulting in resilient properties of the latching means. As a result of the elastic design of the spring tongues, they can be moved radially outwards by the handle in order to introduce the spring tongues into the circumferential depression or to release them from the latter. This simplifies the assembly and disassembly process. A plurality of spring tongues distributed over the circumference is preferably provided, wherein it is also possible for a plurality of spring tongues to be accommodated simultaneously in the depression.

The spring tongues can have radially inward-projecting projections at the free ends. The projections preferably latch into the depression of the handle, thereby enabling unintentional release of the spring tongues from the depression to be prevented.

In a locking position, the second knob element can be connected to the first knob element, wherein the locking element of the second knob element locks the latching means of the first knob element in the radial direction. In this case, the locking element locks the latching means in such a way that the positive connection of the first knob element to the handle cannot be released in the locking position, thereby ensuring that the first knob element is connected to the handle in a captive manner and the second knob element is connected to the first knob element in a captive manner.

The locking element can be formed out of the recess and can thus lock the latching means at the outer circumference in the locking position. The recess is preferably of rotationally symmetrical design, in particular being conical or cylindrical. In addition, an extension can be provided in the region of the recess of the second knob element, said extension extending the recess of the second knob element in the axial direction. In this case, the recess can optionally be extended in both directions by the extension. In the locking position, the inner lateral surface of the extension rests against the latching means. As a result of the extension, the possible contact area of the latching means is enlarged, thereby reducing the risk of tilting and increasing the ease of handling.

The second knob element can be movable in the longitudinal direction of the handle and, in a release position, can be spaced apart in the axial direction relative to the first knob element. In the release position, the second knob element is preferably spaced apart in such a way relative to the first knob element that the locking element does not lock the latching means. As a result, the positive connection between the first knob element and the handle can be released, thus enabling the first knob element to be removed from the handle. Furthermore, the second knob element can be movable in the longitudinal direction of the handle and can thus be removed from the handle after the removal of the first knob element. Overall, it is thus very easy to remove the entire knob and, for example, to replace it. The mobility of the second knob element relative to the longitudinal extent of the handle is preferably limited, for example by a radial projection of the handle.

The handle can be assigned a fixing element, wherein the fixing element locks the second knob element in the locking position. The fixing element is preferably positioned in such a way that the second knob element is locked in the longitudinal direction of the handle. In this case, it is quite possible for the fixing element to be arranged in such a way that it can rotate around the handle, e.g. if the axial position of the fixing element is fixed by a radial projection in the handle. The fixing element is preferably releasably arranged on the handle, in particular in a manner releasable without tools, thereby substantially simplifying removal of the knob. In addition, this enables the fixing element to be replaced very easily. Furthermore, the fixing element can be designed as a coloured component, wherein the component is provided with a colour coding and thus colour classification of the handle is possible. For example, certain colours can be assigned to certain cleaning operations.

The fixing element can comprise two half-shells which can be releasably connected to one another. In this case, the half-shells can be designed to be transparent, and therefore a flat strip, for example a paper strip or the like, can be arranged between the fixing element and the handle. The strip is visible through the fixing element, making it possible to easily identify colour codes, barcodes, QR codes or even printed company logos, for example. The strip can be positioned by means of a slot between the fixing element and the handle, for example, without detaching the fixing element from the handle.

The half-shells are preferably of integral and materially uniform design. For this purpose, the half-shells can be connected to one another via a film hinge. The half-shells can be fixed at their edges opposite the film hinge, in particular via a positive connection. Alternatively, the fixing element can be configured as an elastic ring with an axial slot, it being possible for the slot to be widened for a short time in such a way that the fixing element can be fixed on the handle or released therefrom. The fixing element is preferably made of plastic or metal.

A sleeve can be arranged between the handle and the recess of the second knob element. The friction between the handle and the sleeve is preferably selected in such a way that there is a smooth axial relative movement between the handle and the sleeve. The sleeve is preferably secured on the handle in a manner secure against rotation, for example by means of a positive tongue-and-groove connection. However, the first and the second knob element are rotatably mounted on the sleeve. It is conceivable to make the sleeve from a stable, e.g. metallic, material in order to achieve a particularly long service life. Alternatively, a high-quality plastic such as polyoxymethylene (POM) can also be used here.

The friction pairing between the sleeve and the second knob element is preferably selected in such a way as to increase the breakaway torque required to overcome the static friction between the sleeve and the second knob element and to initiate a rotary movement between the sleeve and the second knob element. Here, the friction pairing is preferably simultaneously selected in such a way that low sliding friction is combined with high static friction. It is conceivable for the sleeve to be provided with a shape for increasing friction and, for example, to comprise a bulge, an imbalance or a web which comes to rest against the inside of the second knob element. Alternatively, a spring element can be formed out of the sleeve. This can be achieved, for example, by means of a slot extending in the axial direction, the mutually facing edges of the slot projecting radially outwards. This makes it possible to achieve a preload in the radial direction and thus to achieve the static friction necessary for secure retention of the handle. Here, the shaping of the sleeve and the spring element each form a clamping element for increasing the breakaway torque.

In an alternative embodiment, the first knob element is clamped to the handle by means of a clamping element. As a result, an increased breakaway torque is likewise required in order to overcome the static friction between the handle and the first knob element and to initiate a rotary movement between the handle and the first knob element. For this purpose, it is conceivable for a clamping element in the form of a spring acting in the axial direction, for example a diaphragm spring or a clamping ring, to be arranged between the sleeve and the second knob element, which introduces an axial force into the first knob element via the second knob element and clamps the first knob element with respect to the handle. Downward pressure on the knob, which occurs during the cleaning process, results in a reduction in the preload thus generated between the handle and the first knob element by downward pressure on the knob, and this is associated in turn with a reduced friction.

The first knob element, the second knob element, the fixing element and the sleeve can be arranged on a handgrip, wherein the handgrip is mounted on the end of the handle remote from the cleaning device. This makes it possible to pre-assemble the components of the knob on the handgrip independently of the handle in order in this way to reduce the assembly time on the handle. The handgrip is preferably releasably connected to the handle. The handgrip preferably has grip elements on the outer circumferential side, further enhancing manageability during mounting or removal of the handgrip on or from the handle. The handgrip preferably has an elastic grip section. For this purpose, the handgrip can be designed, in particular, as a two-component injection-moulded part.

An embodiment of the invention also relates to a cleaning device, in particular a mop or flat mop, having a handle as described above.

FIG. 1 shows a cleaning device with a handle 1. The cleaning device is designed as a wiper device in the form of a flat mop and has a wiper plate attached to the handle in an articulated manner at one end, wherein a wiper cover is secured exchangeably on the wiper plate. A knob 2 is rotatably arranged at the end of the handle 1 remote from the wiper plate. An ergonomic design is achieved by the rotatably movable arrangement of the knob 2 with respect to the longitudinal axis of the handle 1. This allows a wiping movement of the handle 1 without a rotation of the knob 2. The handle is made of metallic material and is telescopic, allowing the length of the handle 1 to be adapted to the height of the user.

Figure 2:
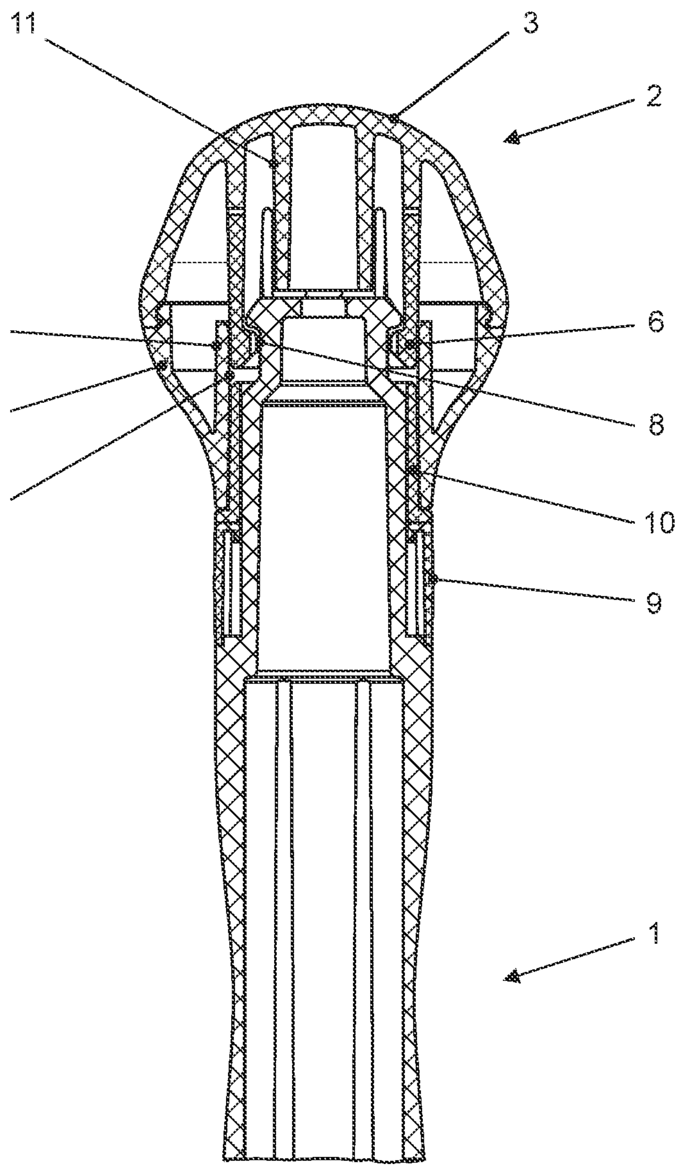
FIG. 2 illustrates a sectional view of the handle for a cleaning device in a locking position of the two knob elements.

FIG. 2 shows a sectional view of the handle 1 shown in FIG. 1 for a cleaning device in a locking position. A knob 2 is rotatably arranged on the handle 1. The knob 2 comprises a first knob element 3 and a second knob element 4. The first knob element 3 is connected to the second knob element 4 and is arranged above the second knob element 4 at one end of the handle 1. The two knob elements 3, 4 are positively connected to one another, wherein the positive connection between the first knob element 3 and the second knob element 4 is a snap closure. In the region of the circumferential edge, the first knob element 3 has a groove on the inside for this purpose, into which an annular projection latches, which is formed on the outside in the region of the circumferential edge of the second knob element 4. This positive connection prevents a relative movement between the knob elements 3, 4 after assembly.

The first and the second knob element 3, 4 are designed externally as hollow hemispheres, with the result that when assembled the knob elements 3, 4 form a spherical knob 2. The first and the second knob element 3, 4 are made of an injection-mouldable plastic, as a result of which the knob 2 has a low mass and at the same time a high strength.

The first knob element 3 comprises an assembly aid 11 on the inside, wherein the assembly aid 11 in the form of a conical formation is formed integrally from the knob element 3. The assembly aid 11 is arranged centrally on the inside of the knob element 3 and faces the end face of the handle 1. In this case, the assembly aid 11 can be brought into contact with the end face of the handle 1, thus enabling a force applied to the outside of the first knob element 3 to be transmitted to the handle 1 via the assembly aid 11. It is advantageous here that the introduction of force takes place directly and in the longitudinal direction via the assembly aid 11. In this case, the assembly aid 11 is preferably slightly spaced apart from the end face of the handle 1 during the intended use of the handle 1, in particular during the cleaning work. The assembly aid 11 makes contact with the end face only when a force acting in the longitudinal direction of the handle 1 is applied to the knob element 3.

The second knob element 4 has centrally a rotationally symmetrical, conical recess 5, in which the handle 1 is rotatably arranged. A sleeve 10 is arranged between the handle 1 and the conical recess 5 of the second knob element 4. The surface of the sleeve 10 is optimized for friction and, in the present embodiment, is made of plastic.

The sleeve 10 is secured on the handle 1 in a manner secure against rotation by means of a positive connection. In addition, the friction between the sleeve 10 and the second knob element 4 is deliberately increased, such that an increased breakaway torque is required to overcome the static friction between the sleeve 10 and the second knob element 4 and to initiate a rotary movement between the sleeve 10 and the second knob element 4. For this purpose, the sleeve 10 has a slot which extends in the axial direction, the mutually facing edges of the slot projecting radially outwards. This results in a preload in the radial direction and thus in a deliberately increased static friction.

According to an alternative embodiment, the first knob element 3 is clamped to the handle 1 by means of a clamping element. As a result, an increased breakaway torque is likewise required in order to overcome the static friction between the handle 1 and the first knob element 3 and to initiate a rotary movement between the handle 1 and the first knob element 3. This can be achieved by means of a diaphragm spring or a clamping ring, which are arranged between the sleeve 10 and the second knob element 4, such that an axial force is introduced into the first knob element 3 via the second knob element 4, and the first knob element 3 is clamped on the handle 1.

In the region of the end of the handle 1 associated with the knob, a circumferential depression 8 is introduced, wherein the depression 8 receives the latching means 6 of the first knob element 3. The depression 8 is designed as a circumferential groove. By virtue of the fact that the depression 8 is introduced over the entire circumference, the first knob element 3 and hence the entire knob 2 can be rotated freely around the handle 1.

The first knob element 3 is equipped with latching means 6, by means of which the first knob element 3 is positively connected to the handle 1. In this case, the latching means 6 are designed as elastic spring tongues. As a result of the elastic design of the spring tongues, they can be moved 1 radially outwards from the handle 1 (in a release position, see FIG. 3) in order to introduce the spring tongues into the circumferential depression 8 or to release them from the latter. A plurality of spring tongues is arranged in a manner distributed over the circumference, wherein a plurality of spring tongues is also accommodated simultaneously in the depression. The spring tongues have radially inward-projecting projections at the free ends. Here, the projections preferably latch into the depression 8 of the handle 1, thereby making unintentional release of the spring tongues from the depression 8 more difficult.

The second knob element 4 has a locking element 7. The first knob element 3 and the second knob element 4 are connected to one another, with the result that the locking element 7 locks the latching means 6 of the first knob element 3 relative to the handle 1. In a locking position, the second knob element 4 is connected to the first knob element 3, wherein the locking element 7 of the second knob element 4 locks the latching means 6 of the first knob element 3 in the radial direction. In this case, the locking element 7 locks the latching means 6 in such a way that the positive connection of the first knob element 3 to the handle 1 cannot be released in the locking position, thereby ensuring that the first knob element 3 is connected to the handle 1 in a captive manner and the second knob element 4 is connected to the first knob element 3 in a captive manner. The locking element 7 is formed out of the recess 5 and covers the latching means 6 circumferentially in the locking position, with the result that the latching means 6 is locked in the radial direction.

A tubular extension can be provided in the region of the recess 5 of the second knob element 4, said extension extending the recess 5 of the second knob element 4 in the axial direction. In this case, the recess 5 is extended in both directions by the tubular extension. In the present embodiment, the inner lateral surface of the tubular extension also forms the locking element 7 and, in the locking position, rests with its inside against the outside of the latching means 6. As a result of the tubular extension, the possible contact area of the locking element 7 or for the latching means 6 is enlarged, thereby reducing the risk of tilting and increasing the ease of handling.

The handle 1 is assigned a fixing element 9, wherein the fixing element 9 locks the second knob element 4 in the locking position. The fixing element 9 is positioned in such a way that the second knob element 4 is immovable in the longitudinal direction of the handle. At the same time, the fixing element 9 is arranged so as to be rotatable around the handle 1. The axial position of the fixing element 9 is fixed by a radial projection in the handle 1. The fixing element 9 is arranged on the handle 1 in such a way as to be releasable without tools. The fixing element 9 is designed as a single-coloured component, providing a colour classification of the handle 1. The fixing element 9 comprises two half-shells which can be releasably connected to one another. The half-shells are connected to one another via a film hinge and can be connected to one another positively on their sides opposite the film hinge. The fixing element 9 is manufactured from plastic.

Figure 3:
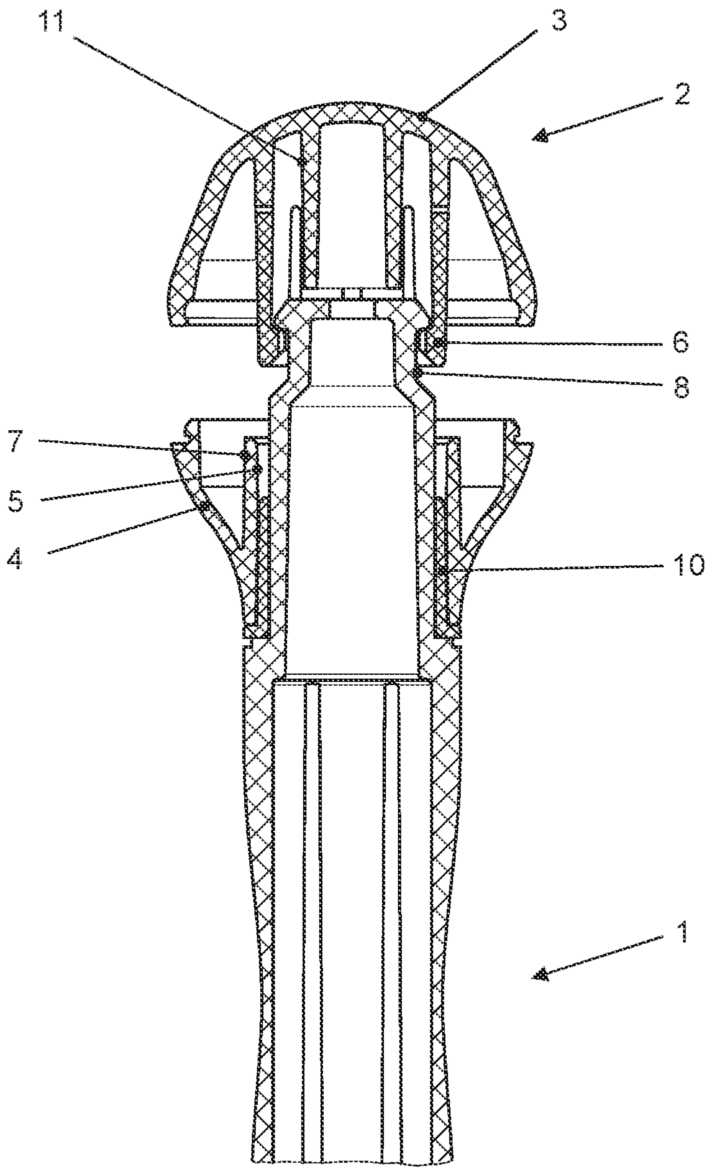
FIG. 3 illustrates a sectional view of the handle for a cleaning device in a release position of the two knob elements.

FIG. 3 shows a sectional view of the handle 1 shown in FIGS. 1 and 2 for a cleaning device having the second knob element 4 in a release position. The fixing element 9 is removed from the handle 1 in this position. The first knob element 3 is likewise at a distance from the second knob element 4.

Removing the fixing element 9 exposes a handle section and enables the second knob element 4 to be moved in the longitudinal direction of the handle 1. However, the second knob element 4 cannot be moved over the entire length of the handle 1, but is locked by a radial projection formed out of the handle 1.

In the illustrated release position, the second knob element 4 is spaced apart in the axial direction relative to the first knob element 3. In the release position, the second knob element 4 is spaced apart in such a way relative to the first knob element 3 that the locking element 7 is spaced apart from the latching means 6, with the result that the latching means 6 is released. As a result, the positive connection between the first knob element 3 and the handle 1 can be released by moving the latching means 6 radially outwards over the circumference and removing it from the circumferential depression 8, thus enabling the first knob element 3 to be removed from the handle 1. Furthermore, the second knob element 4 is movable in the longitudinal direction of the handle 1 and, after the removal of the first knob element 3, can thus be removed from the handle 1 via the end of the handle 1, which is then free. It is likewise possible, after the removal of the second knob element 4, to remove the sleeve from the handle 1. Overall, it is thus very easy to remove the entire knob 2 and to replace it in whole or in part. The assembly of the knob then proceeds in the reverse order to that for disassembly.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A handle for a cleaning device, comprising:

a knob which is rotatably arranged at one end of the handle, wherein the knob includes a first knob element and a second knob element, wherein the first knob element is connected to the second knob element, wherein the second knob element has a recess in which the handle is rotatably arranged, wherein the first knob element is equipped with a latch, by which the first knob element is rotatably locked to the handle, wherein the second knob element has a locking element, and wherein the locking element locks the latch of the first knob element relative to the handle when the first knob element and the second knob element are connected to one another.

2. The handle for a cleaning device according to claim 1, wherein the first knob element and the second knob element are positively connected to one another by a positive connection, and wherein the positive connection between the first knob element and the second knob element is a snap closure.

3. The handle for a cleaning device according to claim 1, comprising a circumferential depression, wherein the depression receives the latch of the first knob element.

4. The handle for a cleaning device according to claim 1, wherein the latch is designed as a spring tongue.

5. The handle for a cleaning device according to claim 4, wherein the spring tongue has radially inward-projecting projections at free ends.

6. The handle for a cleaning device according to claim 1, wherein, in a locking position, the second knob element is connected to the first knob element, wherein the locking element of the second knob element locks the latch of the first knob element in a radial direction.

7. The handle for a cleaning device according to claim 6, wherein the locking element is formed out of the recess and locks the latch at an outer circumference in the locking position.

8. The handle for a cleaning device according to claim 6, wherein the second knob element is movable in a longitudinal direction of the handle and, in a release position, is spaced apart in an axial direction relative to the first knob element.

9. The handle for a cleaning device according to claim 6, wherein the handle is assigned a fixing element, wherein the fixing element axially locks the second knob element in the locking position.

10. The handle for a cleaning device according to claim 9, wherein the fixing element comprises two half-shells which can be releasably connected to one another.

11. The handle for a cleaning device according to claim 10, wherein the half-shells are of integral and materially uniform design.

12. The handle for a cleaning device according to claim 1, wherein a sleeve is arranged between the handle and the recess of the second knob element.

13. The handle for a cleaning device according to claim 12, wherein, in order to increase the breakaway torque for initiating the rotary movement of the knob, friction between the sleeve and the second knob element is increased.

14. The handle for a cleaning device according to claim 12, wherein the first knob element is clamped to the handle by a clamping element.

* * * * *